US008628850B2

(12) United States Patent
Shiao et al.

(10) Patent No.: US 8,628,850 B2
(45) Date of Patent: *Jan. 14, 2014

(54) COLORED ROOFING GRANULES WITH INCREASED SOLAR HEAT REFLECTANCE, SOLAR HEAT-REFLECTIVE SHINGLES, AND PROCESS FOR PRODUCING SAME

(71) Applicants: Ming Liang Shiao, Collegeville, PA (US); Husnu M. Kalkanoglu, Swarthmore, PA (US); Keith C. Hong, Litiz, PA (US)

(72) Inventors: Ming Liang Shiao, Collegeville, PA (US); Husnu M. Kalkanoglu, Swarthmore, PA (US); Keith C. Hong, Litiz, PA (US)

(73) Assignee: CertainTeed Corporation, Valley Forge, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/649,321

(22) Filed: Oct. 11, 2012

(65) Prior Publication Data

US 2013/0034696 A1  Feb. 7, 2013

Related U.S. Application Data

(60) Continuation of application No. 13/316,115, filed on Dec. 9, 2011, which is a continuation of application No. 12/839,876, filed on Jul. 20, 2010, now Pat. No. 8,114,516, which is a continuation of application No. 11/760,299, filed on Jun. 8, 2007, now abandoned, which is a division of application No. 10/679,898, filed on Oct. 6, 2003, now Pat. No. 7,241,500.

(51) Int. Cl.
B32B 5/16 (2006.01)

(52) U.S. Cl.
USPC ........... 428/402; 428/403; 428/404; 428/405; 428/406; 428/407; 106/493; 252/587

(58) Field of Classification Search
USPC ................... 428/402–407; 106/493; 252/587
See application file for complete search history.

(56) References Cited

U.S. PATENT DOCUMENTS

| 2,379,358 | A | 6/1945 | Jewett |
| 2,591,149 | A | 4/1952 | Grove |
| 2,614,051 | A | 10/1952 | Buzzell et al. |
| 2,732,311 | A | 1/1956 | Hartwright |
| 2,898,232 | A | 8/1959 | Miller et al. |
| 2,927,045 | A | 3/1960 | Lodge et al. |
| 2,963,378 | A | 12/1960 | Palmquist et al. |
| 2,981,636 | A | 4/1961 | Lodge et al. |
| 3,255,031 | A | 6/1966 | Lodge et al. |
| 3,507,676 | A | 4/1970 | McMahon |
| 4,038,239 | A | 7/1977 | Coyner et al. |
| 4,092,441 | A | 5/1978 | Meyer et al. |
| 4,218,502 | A | 8/1980 | Graham et al. |
| 4,378,408 | A | 3/1983 | Joedicke |
| 4,583,486 | A | 4/1986 | Miller |
| 4,708,812 | A | 11/1987 | Hatfield |
| 4,717,614 | A | 1/1988 | Bondoc et al. |
| 4,916,014 | A | 4/1990 | Weber et al. |
| 5,194,113 | A | 3/1993 | Lasch et al. |
| 5,240,760 | A | 8/1993 | George et al. |
| 5,310,803 | A | 5/1994 | Hansen |
| 5,356,664 | A | 10/1994 | Narayan et al. |
| 5,380,552 | A | 1/1995 | George et al. |
| 5,411,803 | A | 5/1995 | George et al. |
| 5,456,785 | A | 10/1995 | Venable |
| 5,484,477 | A | 1/1996 | George et al. |
| 5,514,350 | A | 5/1996 | Kear et al. |
| 5,516,573 | A | 5/1996 | George et al. |
| 5,541,350 | A | 7/1996 | Murata et al. |
| 5,571,596 | A | 11/1996 | Johnson |
| 5,595,813 | A | 1/1997 | Ogawa et al. |
| 5,620,554 | A | 4/1997 | Venable |
| 5,643,399 | A | 7/1997 | Venable |
| 5,723,516 | A | 3/1998 | Bigham et al. |
| 5,731,369 | A | 3/1998 | Mahoney |
| 5,770,295 | A | 6/1998 | Alderman |
| 5,783,506 | A | 7/1998 | Eppler et al. |
| 5,795,389 | A | 8/1998 | Koschitzky |
| 5,840,111 | A | 11/1998 | Wiederhoft et al. |
| 5,876,683 | A | 3/1999 | Glumac et al. |
| 5,928,761 | A | 7/1999 | Hedblom et al. |
| 5,962,143 | A | 10/1999 | Krauthauser et al. |
| 6,037,289 | A | 3/2000 | Chopin et al. |
| 6,063,312 | A | 5/2000 | Mannheimer |
| 6,124,466 | A | 9/2000 | Matsuno et al. |
| 6,143,318 | A | 11/2000 | Gilchrist et al. |
| 6,156,245 | A | 12/2000 | Takebayashi et al. |
| 6,174,360 | B1 | 1/2001 | Sliwinski et al. |
| 6,214,466 | B1 | 4/2001 | Joedicke |

(Continued)

FOREIGN PATENT DOCUMENTS

| EP | 0003302 | 8/1979 |
| JP | 61176501 | 8/1986 |
| JP | 2004162482 | 6/2004 |

OTHER PUBLICATIONS

Adobe Systems Inc., Technical Guides "Color Models, CIELAB" 2 pgs., 2000.
Adobe Systems Inc., Technical Guides "Color Models, the CIE Color Models," 2 pgs., 2000.
Adobe Systems Inc., Technical Guides "Color Models, CIEXYZ," 2 pgs., 2000.
Adobe Systems Inc., Technical Guides "Color Models, The Munsell Color System," 4 pgs., 2000.
BASF Aktiengesellschaft, "Product Specification, SIXOLUX Metal Gloss L 6015," 1 pg., Sep. 18, 2002.
BASF Aktiengesellschaft, "Product Specification, SIXOLUX Copper Gloss L 3015," 1 pg., Sep. 18, 2002.
BASF Corporation, "BASF launches two new pigments for tile coatings" by BASF Corporation, 1 pg., 1998-2003.

(Continued)

Primary Examiner — Leszek Kiliman
(74) Attorney, Agent, or Firm — Paul & Paul

(57) ABSTRACT

Solar-reflective roofing granules having deep-tone colors are formed by coating base mineral particles with a coating composition including an infrared-reflective pigment. Color is provided by a colored infrared pigment, a light-interference platelet pigment, or a metal oxide.

20 Claims, 2 Drawing Sheets

(56) References Cited

U.S. PATENT DOCUMENTS

| | | |
|---|---|---|
| 6,217,252 B1 | 4/2001 | Tolliver et al. |
| 6,245,381 B1 | 6/2001 | Israel |
| 6,245,850 B1 | 6/2001 | Fields |
| 6,296,912 B1 | 10/2001 | Zickell |
| 6,355,309 B1 | 3/2002 | Fleming et al. |
| 6,362,121 B1 | 3/2002 | Chopin et al. |
| 6,366,397 B1 | 4/2002 | Genjima et al. |
| 6,376,075 B1 | 4/2002 | Tacke-Willemsen et al. |
| 6,426,309 B1 | 7/2002 | Miller et al. |
| 6,446,402 B1 | 9/2002 | Byker et al. |
| 6,451,874 B1 | 9/2002 | Purgett et al. |
| 6,454,848 B2 | 9/2002 | Sliwinski et al. |
| 6,465,088 B1 | 10/2002 | Talpaert et al. |
| 6,500,555 B1 | 12/2002 | Khaldi |
| 6,502,360 B2 | 1/2003 | Carr, III et al. |
| 6,521,038 B2 | 2/2003 | Yanagimoto et al. |
| 6,531,200 B2 | 3/2003 | Zickell |
| 6,533,961 B2 | 3/2003 | Harelstad et al. |
| 6,537,703 B2 | 3/2003 | DuPasquier et al. |
| 6,548,145 B2 | 4/2003 | Joedicke |
| 6,569,520 B1 | 5/2003 | Jacobs |
| 6,572,784 B1 | 6/2003 | Coombs et al. |
| 6,596,070 B1 | 7/2003 | Schmidt et al. |
| 6,599,355 B1 | 7/2003 | Schmidt et al. |
| 6,607,781 B2 | 8/2003 | Joedicke |
| 6,610,135 B1 | 8/2003 | Ohmori et al. |
| 6,610,147 B2 | 8/2003 | Aschenbeck |
| 6,647,688 B1 | 11/2003 | Gaitan et al. |
| 6,653,356 B2 | 11/2003 | Sherman |
| 6,680,134 B2 | 1/2004 | Maurer et al. |
| 6,692,824 B2 | 2/2004 | Benz et al. |
| 6,703,127 B2 | 3/2004 | Davis et al. |
| 6,797,277 B2 | 9/2004 | Heier et al. |
| 6,861,145 B2 | 3/2005 | Nastke et al. |
| 6,881,702 B2 | 4/2005 | Arnold et al. |
| 6,933,007 B2 | 8/2005 | Fensel et al. |
| 7,132,143 B2 | 11/2006 | Zanchetta et al. |
| 7,176,245 B2 | 2/2007 | Stucky et al. |
| 7,238,408 B2 | 7/2007 | Aschenbeck et al. |
| 7,241,500 B2 * | 7/2007 | Shiao et al. ............ 428/402 |
| 8,114,516 B2 * | 2/2012 | Shiao et al. ............ 428/402 |
| 2002/0092596 A1 | 7/2002 | Phillips et al. |
| 2002/0160151 A1 | 10/2002 | Pinault et al. |
| 2003/0035972 A1 | 2/2003 | Hanson et al. |
| 2003/0044525 A1 | 3/2003 | Aschenbeck |
| 2003/0068469 A1 | 4/2003 | Aschenbeck et al. |
| 2003/0091795 A1 | 5/2003 | Kiik et al. |
| 2003/0091814 A1 | 5/2003 | Benz et al. |
| 2003/0152747 A1 | 8/2003 | Fensel et al. |
| 2003/0203145 A1 | 10/2003 | Zanchetta et al. |
| 2003/0219563 A1 | 11/2003 | Zanchetta et al. |
| 2004/0076826 A1 | 4/2004 | Lee |
| 2004/0110639 A1 | 6/2004 | Joedicke |
| 2004/0170806 A1 | 9/2004 | Hittle et al. |
| 2004/0255548 A1 | 12/2004 | Hong et al. |
| 2004/0258835 A1 | 12/2004 | Hong et al. |
| 2005/0053745 A1 | 3/2005 | Bartek et al. |
| 2005/0053746 A1 | 3/2005 | Bartek et al. |
| 2005/0064175 A1 | 3/2005 | Azari et al. |
| 2005/0072110 A1 | 4/2005 | Shiao et al. |
| 2005/0072114 A1 | 4/2005 | Shiao et al. |
| 2006/0110996 A1 | 5/2006 | Getlichermann et al. |
| 2006/0243388 A1 | 11/2006 | Kubiak et al. |

OTHER PUBLICATIONS

Ferro Corporation, "Cool Colors & Eclipse Heat and Energy Saving Pigments," 2 pgs., 1999-2003.

Ferro Corporation, "How Cool Colors & Eclipse Work," 3 pgs., 2003.

G. Beestman, "Microencapsulation of Solid Particles" (H. B. Scher, Ed., Marcel Dekker, Inc., pp. 31-54 New York 1999.

Gaco Western Inc., "Solar Reflectivity of Common Roofing Materials and GACOFlex Roof Coatings," 2 pgs., undated.

Gifty Osei-Prempel, et al., "Synthesis and Application of Flurocarbon Functionalized Mesporous Silica" Materkals Engineering and Sciences Division # 574, 2006.

H. Akbari, "Cool Colored Materials for Roofs," Lawrence Radiation Laboratory presented at Emerging Technologies in Energy Efficiency-Summit 2004, San Francisco, Oct. 14, 2004.

L. Sung, et al., "Characterization of Coating Microstructure Using Laser Scanning Confocal Microscopy," Polymer Materials, Science and Engineering, 83, 343-344, 2000.

L. Sung, et al. "Characterization of Coating Microstructure Using Laser Scanning Confocal Microscopy," undated.

Ming-Zhi, et al., "A novel fabrication of meso-porous silica film by sol-gel of TEOS," Journal of Zhejiang University Science, 442-427, 2004.

Project Advisory Committee Meeting, "Development of Cool Colored Roofing Materials," Oak Ridge National Laboratory and Livermore Berkeley National Laboratory, 55 pgs., Mar. 11, 2003.

Qingyuan Hu, "Synthesis and Characterization of Functionalized Mesoporous Silica by Aerosol-Assisted Self-Assembly," Chemical & Biomolecular Engineering, # 574 2006.

Rhonda Stroud, "Silica Sol as 'Nanoglue'," Naval Research Laboratory, American Physical Society, Mar. 2000.

Silberline Manufacturing Co., Inc., "StarBrite," 1 pg., 2003.

T. A. Germer, et al., "Modeling the Appearance of special Effect Pigment Coatings," Surface Scattering and Diffraction for Advance Metrology, Proc., SPIE 4447, 77-96, 2001.

Y. Jiang, et al., "Novel Pigment Approaches in Optically Variable Security Inks Including Polarizing Cholesteric Liquid Crystal (CLC) Polymers," Optical Security and Counterfeit Deterrence Techniques IV, SPIE 4677, 2000.

* cited by examiner

COLORED ROOFING GRANULES WITH INCREASED SOLAR HEAT REFLECTANCE, SOLAR HEAT-REFLECTIVE SHINGLES, AND PROCESS FOR PRODUCING SAME

CROSS-REFERENCE TO RELATED APPLICATIONS

The present application is a continuation of U.S. patent application Ser. No. 13/316,115, filed Dec. 9, 2011, currently pending, which is a continuation of U.S. patent application Ser. No. 12/839,876, filed Jul. 20, 2010, now U.S. Pat. No. 8,114,516, issued Feb. 14, 2012, which is a continuation of U.S. patent application Ser. No. 11/760,299 filed Jun. 8, 2007, which is a division of U.S. patent application Ser. No. 10/679,898, filed Oct. 6, 2003, now U.S. Pat. No. 7,241,500, issued Jul. 10, 2007.

BACKGROUND OF THE INVENTION

1. Field of the Invention

The present invention relates to asphalt roofing shingles, and protective granules for such shingles, and processes for making such granules and shingles.

2. Brief Description of the Prior Art

Pigment-coated mineral rocks are commonly used as color granules in roofing applications to provide aesthetic as well as protective functions to the asphalt shingles. Roofing granules are generally used in asphalt shingle or in roofing membranes to protect asphalt from harmful ultraviolet radiation.

Roofing granules typically comprise crushed and screened mineral materials, which are subsequently coated with a binder containing one or more coloring pigments, such as suitable metal oxides. The binder can be a soluble alkaline silicate that is subsequently insolubilized by heat or by chemical reaction, such as by reaction between an acidic material and the alkaline silicate, resulting in an insoluble colored coating on the mineral particles. Preparation of colored, coated roofing granules is disclosed for example, in U.S. Pat. No. 2,981,636 of Lodge et al. The granules are then employed to provide a protective layer on asphaltic roofing materials such as shingles, and to add aesthetic values to a roof.

U.S. Pat. No. 2,732,311 of Hartwright discloses a method for preparing roofing granules having metal flakes, such as aluminum flakes, adhered to their surfaces, to provide a radiation-reflective surface. Rock granules are first mixed with kaolin clay, and then a stream of sodium silicate solution is added. A tacky viscous film is developed on the surface of the granules by passing air through the mixture while it is being mixed, and a fine grade of metal flakes is added, and the flake-coated granules are subsequently fired to cure the clay-silicate binder.

Pigments for roofing granules have usually been selected to provide shingles having an attractive appearance, with little thought to the thermal stresses encountered on shingled roofs. However, depending on location and climate, shingled roofs can experience very challenging environmental conditions, which tend to reduce the effective service life of such roofs. One significant environmental stress is the elevated temperature experienced by roofing shingles under sunny, summer conditions, especially roofing shingles coated with dark colored roofing granules. Although such roofs can be coated with solar reflective paint or coating material, such as a composition containing a significant amount of titanium dioxide pigment, in order to reduce such thermal stresses, this utilitarian approach will often prove to be aesthetically undesirable, especially for residential roofs.

Asphalt shingles coated with conventional roofing granules are known to have low solar heat reflectance, and hence will absorb solar heat especially through the near infrared range (700 nm-2500 nm) of the solar spectrum. This phenomenon is increased as the granules covering the surface become dark in color. For example, while white-colored asphalt shingles can have solar reflectance in the range of 25-35%, dark-colored asphalt shingles can only have solar reflectance of 5-15%. Furthermore, except in the white or very light colors, there is typically only a very small amount of pigment in the conventional granule's color coating that reflects solar radiation well. As a result, it is common to measure temperatures as high as 77 degrees C. on the surface of black roofing shingles on a sunny day with 21 degrees C. ambient temperature. Absorption of solar heat may result in elevated temperatures at the shingle's surroundings, which can contribute to the so-called heat-island effects and increase the cooling load to its surroundings.

There is a continuing need for roofing materials, and especially asphalt shingles, that have improved resistance to thermal stresses while providing an attractive appearance. In particular, there is a need for roofing granules that provide increased solar heat reflectance to reduce the solar absorption of the shingle, while providing a wide range of colors including deep-tone colors to maintain the aesthetic value of the system.

SUMMARY OF THE INVENTION

The present invention provides roofing granules that provide increased solar heat reflectance, while providing deep-tone colors, as well as a process for preparing such roofing granules, and asphalt shingle roofing products incorporating such roofing granules.

In one aspect of the present invention, roofing granules are colored by the combination of a binder, for example, a metal silicate binder or polymeric binder suitable for outdoor exposure, and special pigments that have high reflective properties towards the solar heat radiation while simultaneously serving as a colorant. Specifically, colored, infrared-reflective pigments, such as those disclosed in U.S. Pat. No. 6,174,360 and comprising a solid solution including iron oxide, can be employed in producing the colored infrared-reflective roofing granules of the present invention. The colored, infrared-reflective pigment can also comprise a near infrared-reflecting composite pigment such as disclosed in U.S. Pat. No. 6,521,038. Composite pigments are composed of a near-infrared non-absorbing colorant of a chromatic or black color and a white pigment coated with the near infrared-absorbing colorant.

In addition to or in the alternative to employing colored, infrared-reflective pigments selected from the group consisting of a solid solution including iron oxide and near infrared-reflecting composite pigments, infrared-reflective roofing granules of the present invention can be prepared using infrared-reflective "functional" pigments. Infrared-reflective functional pigments include light-interference platelet pigments including titanium dioxide, light-interference platelet pigments based on metal oxide coated-substrate, mirrorized silica pigments based upon metal-doped silica, and alumina. Such infrared-reflective functional pigments have been found to enhance the solar heat reflectance when incorporated in roofing granules.

Thus, in one aspect, the process of the present invention provides roofing granules colored by light-interference platelet pigments and/or infrared ("IR")-reflective color pigments to achieve higher solar heat reflection. These "pearlescent" pigments based on metal oxide-coated substrates allow additional solar reflection to achieve both colors and increased solar heat reflection. Light-interference platelet pigments based on metal oxide coated-substrates are preferably selected from those pigments constructed from partially opaque substrates, such as mica, alumina, or silica, and metal-oxide coatings having light-interference properties.

In another aspect of the present invention, colored infrared-reflective roofing granules are provided by coating inert mineral particles with a first coating composition including a binder and at least one reflective white pigment, and curing the first coating composition on the inert mineral particles to form base particles. The base particles are then coated with a second coating composition including a binder and at least one colorant selected from the group consisting of uv-stabilized dyes and granule coloring pigments, and the second coating composition is then cured. The granule coloring pigments can be conventional granule coloring pigments based on metal oxides, or colored infrared-reflective pigments. Optionally, the second coating composition can include at least one infrared-reflective functional pigment.

In yet another aspect of the present invention, colored infrared-reflective roofing granules are provided by a process comprising providing an inert mineral particle and coating the inert mineral particles with a first coating composition including a base particle binder, and at least one colorant selected from the group consisting of uv-stabilized dyes and granule coloring pigments, and curing the first coating composition on the inert particles to form base particles. The base particles are then coated with a second coating composition including a coating binder, and at least one infrared-reflective functional pigment selected from the group consisting of light-interference platelet pigments including mica, light-interference platelet pigments including titanium dioxide, mirrorized silica pigments based upon metal-doped silica, and alumina, and the second coating composition is then cured.

Coating compositions employed by the present invention can include metal-silicate binders or organic polymeric binders. Organic binders advantageously permit lower curing temperatures than metal-silicate binders, and do not require additional surface treatment for water repellency and staining resistance, and/or slate oils to reduce dusting during transportation.

The process of the present invention produces colored infrared-reflective roofing granules that have a higher solar heat reflectance than colored roofing granules prepared using conventional metal oxide colorants, which typically have a solar heat reflectance of from about 12 percent to about 20 percent. Thus, it is preferred that the colored infrared-reflective roofing granules of the present invention have a solar heat reflectance greater than about 20 percent. It is especially preferred that the colored infrared-reflective roofing granules according to the present invention have a solar heat reflectance of at least about 25 percent, and that bituminous roofing products, such as asphaltic roofing shingles, made with such colored infrared-reflective roofing granules have a solar heat reflectance of at least about 20 percent, more preferably at least about 25 percent, with a solar heat reflectance of at least about 30 percent being especially preferred.

The present invention also provides a process for increasing the solar or infrared reflectance of colored roofing granules by at least about 20 percent, more preferably at least about 25 percent, while substantially maintaining the color of the roofing granules, such that the value of the total color difference $\Delta E^*$ is no more than 10 units, more preferably no more than 5 units, and even more preferably no more than 3 units.

In general, the process of the present invention for producing colored, infrared-reflective roofing granules comprises (a) providing base particles; (b) coating the base particles with a coating composition including (i) a coating binder, and (ii) at least one infrared-reflective pigment, and (c) curing the coating composition to form coated granules. As noted above, the colored, infrared-reflective roofing granules of the present invention can be colored in a variety of different ways. First, the infrared-reflective pigment itself can be colored. Alternatively, the infrared-reflective pigment can be a "functional" pigment that contributes to the color of the granules, but may be supplemented by other colorants. Finally, the color of the granules can be supplied largely by conventional colorants, with the infrared-reflectance being attributable to other materials.

The colored, infrared-reflective granules of the present invention preferably have a relatively dark shade, characterized by a value of $L^*$ of less than 85, more preferably, less than 55, and even more preferably less than about 45.

Preferably, the coating composition comprises from about 2 percent by weight of the base particles to about 20 percent by weight of the base particles. More preferably, the coating composition comprises from about 4 percent by weight of the base particles to about 10 percent by weight of the base particles.

In one presently preferred embodiment, the base particle binder and/or the coating binder comprises an inorganic binder, specifically an aluminosilicate material and an alkali metal silicate, and the aluminosilicate material comprises a clay. Alternatively, the base particle binder and/or the coating binder comprise an organic binder, such as an organic polymeric material. Preferred polymeric materials useful as binders include acrylic polymers and copolymers. The selection of the binder depends upon the nature of the infrared-reflective pigment or pigments employed, such that the binder is chosen to avoid degradation of the pigment during cure of the binder.

It is preferred that the at least one infrared-reflective pigment comprises from about 1 percent by weight to about 60 percent by weight of the coating composition in which it is dispersed. When the binder comprises an organic binder, it is especially preferred that the at least one solar reflective pigment comprises about 40 percent by weight of the coating composition.

Preferably, in the second and third embodiments of the present process, the base particles themselves are provided by a process comprising (a) providing an inert mineral particle; (b) coating the inert mineral particle with a base coating composition including (i) a base particle binder, and (ii) at least one reflective white pigment, and (c) curing the base coating composition. Optionally, the base coating composition includes at least one colorant. Alternatively, the base particles comprise conventional colored roofing granules, prepared by coating inert mineral particles with a coating composition including a silicate binder and metal oxide pigment.

Preferably, the reflective white pigment has a solar heat reflectance of at least about 60 percent. The reflective white pigment is preferably selected from the group comprising titanium dioxide, zinc oxide and zinc sulfide.

Preferably, the at least one reflective white pigment comprises from about 5 percent by weight to about 60 percent by weight of the base coating composition (second embodiment) or first coating composition (third embodiment). More preferably, the at least one reflective white pigment comprises from about 30 to about 40 percent by weight of the base or first coating composition.

It is also preferred that the base or first coating composition comprises from about 1 percent by weight of the inert mineral particles to about 20 percent by weight of the inert mineral particles. More preferably, the base or first coating composition comprises about 8 percent by weight of the inert mineral particles.

The coating compositions employed in various embodiments of the process of the present invention may further comprise at least one additional coloring material selected from the group comprising coloring pigments and uv-stabilized dyes. The additional coloring material can be provided to achieve a desired color. Preferably, the coloring pigments are selected from the group comprising transition metal oxides. In addition, the coating may further comprise fillers, such as clay, talc, or glass microspheres, to increase the hiding of substrate.

In three presently preferred embodiments, the present invention provides a process for producing infrared-reflective roofing granules with at least two coating layers. In these embodiments, the process includes providing inert mineral particles and coating the inert mineral particles with a first or base coating composition, and then curing the cured first or base coating composition to provide coated base particles having a first coating layer. Next, the process includes further coating the coated base particles with a second coating composition; and curing the second coating composition to provide coated particles with a second coating layer. In two of these embodiments, the first coating composition includes a base particle binder and at least one infrared-reflective white pigment, and the second coating composition includes a coating binder and a coloring material, such as a colored, infrared-reflective pigment or a colorant. In the third embodiment, the first coating composition includes a colorant, while the second coating composition includes an infrared-reflective functional pigment.

In the second and third embodiments described above, the present invention provides roofing granules that have an inner coating with high solar heat reflectance by using $TiO_2$ pigments or other highly reflective pigments, and an outer coating to provide desirable colors. The inner coating is used to reflect most solar radiation that has penetrated the color coating in order to improve the overall solar heat reflectance. The outer color coating also optionally employs light-interference platelet pigments or infrared-reflective color pigments to further enhance the solar heat reflectance.

In the fourth embodiment described above, the present invention provides roofing granules that have an inner color coating to provide desirable colors and an outer coating that has infrared-reflective properties. The outer clear coating is preferably transparent to visible light but is reflective towards the infrared range of the solar spectrum. The outer coating is comprised of suitable binders from metal-silicates or more preferably, organic polymeric binders, and transparent IR-reflective pigments, nano-$TiO_2$, or mirrorized fillers.

The infrared-reflective granules of the present invention can be prepared by pre-mixing the components of the infrared-reflective coating, namely the binder, pigment(s), and optional additives to a slurry consistency, followed by uniform mixing with the base particles, such as mixing in a rotary tumbler, to achieve a uniform coating on the base particles.

The weight of the infrared-reflective coating composition is preferably from about 2% by weight to about 20% of the weight of the base particles, more preferably from about 4% by weight to about 10% by weight of the base particles. After the mixing, the coated granules can be dried in a rotary drum or fluidized bed with suitable heat to cure the infrared-reflective coating. Alternatively, the base particles can be spray-coated by the pre-mixed infrared-reflective coating composition in a rotary drum to achieve uniform coverage, followed by drying to achieve a durable infrared-reflective coating.

Preferably, an organic binder providing a high gloss appearance is employed, to achieve added aesthetic values beyond the increase in solar heat reflectance.

The method of preparation for the infrared-reflective granules will become more apparent to those who are skilled in the art of coating granular materials with organic binders.

After the preparation of the granules to reach desirable colors, particularly in the mid to deep tone colors, the granules can then be deposited onto the asphalt shingle surface during the shingle manufacturing to enhance the solar heat reflectance of the final product.

The present invention also provides a process for producing infrared-reflective roofing shingles, as well as the shingles themselves. This process comprises producing infrared-reflective roofing granules using the process of this invention, and adhering the granules to a shingle stock material.

The colored, infrared-reflective roofing granules prepared according to the process of the present invention can be employed in the manufacture of infrared-reflective roofing products, such as infrared-reflective asphalt shingles and roll goods, including bituminous membrane roll goods. The colored, infrared-reflective granules of the present invention can be mixed with conventional roofing granules, and the granule mixture can be embedded in the surface of bituminous roofing products using conventional methods. Alternatively, the colored, infrared-reflective granules of the present invention can be substituted for conventional roofing granules in manufacture of bituminous roofing products, such as asphalt roofing shingles, to provide those roofing products with solar-reflectance.

DETAILED DESCRIPTION OF THE PREFERRED EMBODIMENTS

Figure 1:
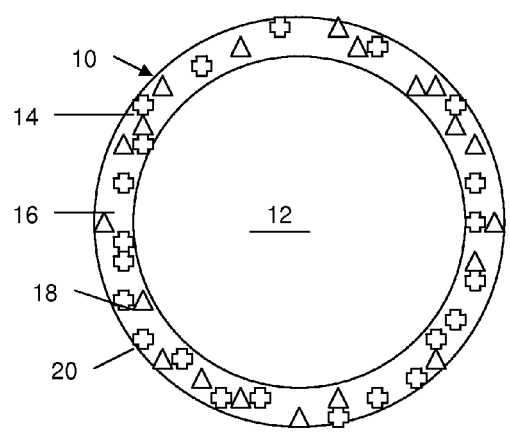
FIG. 1 is a schematic illustration of the structure of a colored infrared-reflective roofing granule according to a first embodiment of the present invention.

The infrared-reflective granules of the present invention can be prepared through traditional granule coloring methods, such as those disclosed in U.S. Pat. No. 2,981,636, incorporated herein by reference.

Suitable inert base particles, for example, mineral particles with size passing #8 mesh and retaining on #70 mesh, can be coated with a combination of the metal-silicate binders, kaolin clay, and reflective pigments, or a combination of other color pigments to reach desirable colors, followed by a heat treatment to obtain a durable coating.

Such a coating process can be repeated to form multiple coatings to further enhance the color and solar heat reflection.

As used in the present specification, "colored" means having an L* value of less than 85, preferably less than 55, even more preferably less than 45, when measured using a HunterLab Model Labscan XE spectrophotometer using a 0 degree viewing angle, a 45 degree illumination angle, a 10 degree standard observer, and a D-65 illuminant. "Colored" as so defined is intended to include relatively dark tones.

As used in the present specification and claims, "infrared-reflective functional pigment" denotes a pigment selected from the group consisting of light-interference platelet pigments including mica, light-interference platelet pigments including titanium dioxide, mirrorized silica pigments based upon metal-doped silica, and alumina. As used in the present specification and claims, "granule coloring pigment" denotes a conventional metal oxide-type pigment employed to color roofing granules. UV-stabilized dyes are dye compositions formulated with uv-stabilization materials.

As used in the present specification, the strength in color space E* is defined as $E^*=(L^{*2}+a^{*2}+b^{*2})^{1/2}$, where L*, a*, and b* are the color measurements for a given sample using the 1976 CIE L*a*b* color space. The total color difference $\Delta E^*$ is defined as $\Delta E^*=(\Delta L^{*2}+\Delta a^{*2}+\Delta b^{*2})^{1/2}$ where $\Delta L^*$, $\Delta a^*$, and $\Delta b^*$ are respectively the differences in L*, a* and b* for two different color measurements.

The inert base particles employed in the process of the present invention are preferably chemically inert materials, such as inert mineral particles. The mineral particles, which can be produced by a series of quarrying, crushing, and screening operations, are generally intermediate between sand and gravel in size (that is, between about 8 US mesh and 70 US mesh), and preferably have an average particle size of from about 0.2 mm to about 3 mm, and more preferably from about 0.4 mm to about 2.4 mm.

In particular, suitably sized particles of naturally occurring materials such as talc, slag, granite, silica sand, greenstone, andesite, porphyry, marble, syenite, rhyolite, diabase, greystone, quartz, slate, trap rock, basalt, and marine shells can be used, as well as recycled manufactured materials such as crushed bricks, concrete, porcelain, fire clay, and the like.

In one set of presently preferred embodiments, the inert base particles comprise particles having a generally plate-like geometry. Examples of generally plate-like particles include mica and flaky slate. Colored roofing granules having a generally plate-like geometry have been found to provide greater surface coverage when used to prepare bituminous roofing products, when compared with conventional "cubical" roofing granules, as shown in Table 1 below. Granule surface coverage is measured using image analysis software, namely, Image-Pro Plus from Media Cybernetics, Inc., Silver Spring, Md. 20910. The shingle surface area is recorded in a black and white image using a CCD camera fitted to a microscope. The image is then separated into an asphalt coating portion and a granule covering portion using the threshold method in gray scale. The amount of granule coverage is then calculated by the image analysis software based upon the number of pixels with gray scale above the threshold level divided by the total number of pixels in the image.

TABLE 1

| Sample | Color | Granule Type | Surface Coverage % |
|---|---|---|---|
| A | White | cubical | 86.0 |
| B | Wood Blend | cubical | 86.6 |
| C | Natural | flaky slate | 91.6 |
| D | Natural | flaky slate | 92.1 |
| E | Natural | flaky slate | 92.9 |
| F | Natural | flaky slate | 91.8 |

Referring now to the figures in which like reference numerals represent like elements in each of the several views, there is shown in FIG. 1, a schematic illustration of the structure of a colored infrared-reflective roofing granule 10 according to a presently preferred first embodiment of the present invention. The colored infrared-reflective roofing granule 10 includes a base particle 12 coated with a cured coating composition 14 comprising a coating binder 16 and at least one colored, infrared-reflective pigment 18. Preferably, in the colored infrared-reflective roofing granules 10 the at least one colored, infrared-reflective pigment 18 is selected from the group consisting of (1) infrared-reflective pigments comprising a solid solution including iron oxide and (2) near infrared-reflecting composite pigments. Preferably, in colored, infra-red-reflective roofing granules 10, the infrared-reflective pigment 18 comprises from about 1 percent by weight to about 60 percent by weight of the coating composition 14. Preferably, the cured coating composition 14 of the colored infrared-reflective roofing granules 10 further comprises at least one infrared-reflective functional pigment 20 selected from the group consisting of light-interference platelet pigments including mica, light-interference platelet pigments including titanium dioxide, mirrorized silica pigments based upon metal-doped silica, and alumina. Preferably, the cured coating composition 14 comprises from about 2 percent by weight of the base particles 12 to about 20 percent by weight of the base particles 12. More preferably, the cured coating composition 14 comprises from about 4 percent by weight of the base particles 12 to about 10 percent by weight of the base particles 12. When alumina is included in the coating composition 14 as an infrared-reflective functional pigment 20, the particle size of the alumina is preferably less than 425 μm. More preferably, the particle size of the alumina is from about 0.1 μm to about 5 μm, and even more preferably from about 0.3 μm to about 2 μm. The coating binder 16 can comprise an aluminosilicate material, such as clay, and an alkali metal silicate. Alternatively, the coating binder 16 can comprise an organic material. Optionally, the coating composition 14 can include at least one coloring material selected from the group consisting of granule coloring pigments and uv-stabilized dyes.

Thus, in this first embodiment of colored infrared roofing granules 10 of the present invention, the infrared reflectance of the colored roofing granules 10 is attributable to the colored, infrared-reflective pigment 18 and the optional infrared-reflective functional pigment 20, while the color of the granules 10 is substantially attributable to the colored, infrared-reflective pigment 18.

Figure 2:
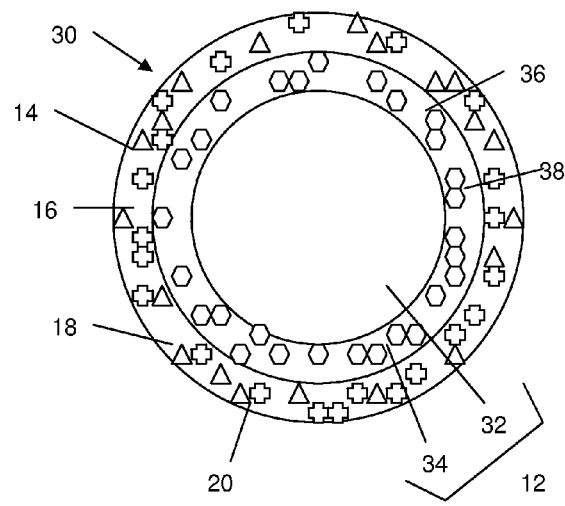
FIG. 2 is a schematic illustration of the structure of a colored infrared-reflective roofing granule according to a second embodiment of the present invention.

FIG. 2 is a schematic illustration of the structure of a colored infrared-reflective roofing granule 30 according to a presently preferred second embodiment of the present invention. In this embodiment, roofing granule 30 includes a base particle 12 comprising a mineral particle 32 coated with a cured base coating composition 34 including a base particle binder 36, and at least one reflective white pigment 38. Preferably, the at least one reflective white pigment 38 is selected from the group consisting of titanium dioxide, zinc oxide and zinc sulfide. It is preferred that the at least one reflective white pigment 38 comprises from about 5 percent by weight to about 60 percent by weight of the base coating composition 34, and more preferred that the at least one reflective white pigment 38 comprises from about 30 percent by weight to about 40 percent by weight of the base coating composition 34. In this embodiment, the base coating composition 34 preferably comprises from about 1 percent by weight of the inert mineral particles 32 to about 20 percent by weight of the inert mineral particles 32, and more preferably, from about 4 percent by weight of the base particles to about 10 percent by weight of the inert mineral particles. The base particle binder 36 preferably comprises an aluminosilicate material and an alkali metal silicate, and the aluminosilicate material is preferably clay, although an organic material can optionally be employed as the base particle binder 36. The colored infrared-reflective roofing granules 30 of this second embodiment include a second, cured coating composition 14, comprising a coating binder 14, and a colored, infrared-reflective pigment 18, as well as an optional infrared-reflective functional pigment 20, as in the cured coating composition of the above-described first embodiment of a colored infrared-reflective roofing granule 10.

Thus, in one aspect of the present invention, a first coating composition or base coating composition including a white, solar-reflective pigment such as titanium dioxide pigment is applied to the mineral particles to cover the dark color, low infrared-reflective mineral surface. Once the base coating is cured, a second coating composition or finish coat comprising a second coating composition including pigments of high infrared reflectance can then be applied and cured to create deeper tones of colors while generating a surface with high reflectance for solar heat.

In this second embodiment of colored infrared roofing granules 30 of the present invention, the infrared reflectance of the colored roofing granules 30 is attributable to the reflective white pigment 38 in the inner layer of the cured base coating composition 34, as well as to the colored, infrared-reflective pigment 18 and the optional infrared-reflective functional pigment 20 in the outer layer of the cured coating composition 14, while the color of the granules 30 is substantially attributable to the colored, infrared-reflective pigment 18 in the outer layer of the cured coating composition 14.

Figure 3:
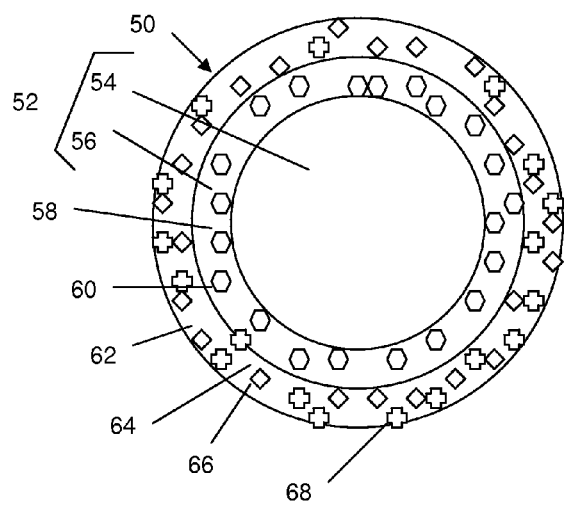
FIG. 3 is a schematic illustration of the structure of a colored infrared-reflective roofing granule according to a third embodiment of the present invention.

FIG. 3 is a schematic illustration of the structure of a colored infrared-reflective roofing granule 50 according to a presently preferred third embodiment of the present invention. In this embodiment, the colored infrared-reflective roofing granules 50 comprise base particles 52 comprising inert mineral particles 54 coated with a cured first coating composition 56 including a base particle binder 58 and at least one reflective white pigment 60, and the base particles 52 are coated with a cured second coating composition 62 including a coating binder 64, and at least one colorant 66 selected from the group consisting of uv-stabilized dyes and granule coloring pigments. Preferably, the cured second coating composition 62 is transparent to infrared radiation. Preferably, the thickness of the layer formed by the cured second coating composition 62, the coating binder 64, and the at least one colorant 66 are selected to maximize infrared transparency consistent with achieving the desired color tone for the roofing granule 50.

Preferably, in the colored infrared-reflective roofing granules 50 the at least one colorant 66 comprises from about 1 percent by weight to about 60 percent by weight of the second coating composition 62. In the colored infrared-reflective roofing granules 50 of the third embodiment, the second coating composition 62 preferably further comprises at least one infrared-reflective functional pigment 68 selected from the group consisting of light-interference platelet pigments including mica, light-interference platelet pigments including titanium dioxide, mirrorized silica pigments based upon metal-doped silica, and alumina, and the at least one infrared-reflective functional pigment 68 preferably comprises from about 1 percent by weight to about 60 percent by weight of the second coating composition 62. When alumina is included in the cured second coating composition 62 as an infrared-reflective functional pigment 68, the particle size of the alumina is preferably less than 425 μm. More preferably, the particle size of the alumina is from about 0.1 μm to about 5 μm, and even more preferably from about 0.3 μm to about 2 μm. In this third embodiment, the second coating composition 62 comprises from about 2 percent by weight of the base particles 52 to about 20 percent by weight of the base particles 52, more preferably, from about 4 percent by weight of the base particles 52 to about 10 percent by weight of the base particles 52. In this third embodiment, the first or base coating composition 56 preferably comprises from about 1 percent by weight of the inert mineral particles 54 to about 20 percent by weight of the inert mineral particles 54. In this third embodiment, the base particle binder 58 preferably comprises an aluminosilicate material and an alkali metal silicate, and the aluminosilicate material is preferably clay, although an organic material can optionally be employed as the base particle binder 58.

Preferably, in this third embodiment the at least one reflective white pigment 60 is selected from the group consisting of titanium dioxide, zinc oxide and zinc sulfide. It is preferred that the at least one reflective white pigment 60 comprises from about 5 percent by weight to about 60 percent by weight of the base or first coating composition 56, and more preferred that the at least one reflective white pigment 60 comprises from about 30 percent by weight to about 40 percent by weight of the base coating composition 56.

Thus, in this third embodiment of colored infrared-reflective roofing granules 50 according to the present invention, the infrared reflectance of the colored roofing granules 50 is attributable to the reflective white pigment 60 in the inner layer of the cured first coating composition 56, and the optional infrared-reflective functional pigment 68 in the outer layer of the cured second coating composition 62, while the color of the granules 50 is substantially attributable to the colorant 66 in the outer layer of the cured second coating composition 62.

Figure 4:
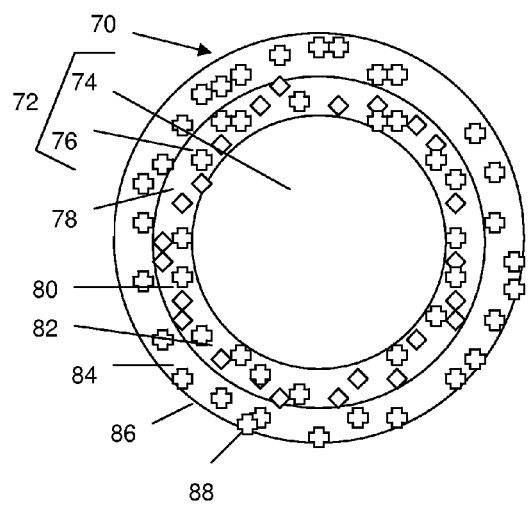
FIG. 4 is a schematic illustration of the structure of a colored infrared-reflective roofing granule according to a fourth embodiment of the present invention.

FIG. 4 is a schematic illustration of the structure of a colored infrared-reflective roofing granule 70 according to a presently preferred fourth embodiment of the present invention. In this embodiment, the colored infrared-reflective roofing granule 70 comprises inert mineral particles 74 coated with a cured first coating composition 76 including a base particle binder 78 and at least one colorant 80 selected from the group consisting of uv-stabilized dyes and granule coloring pigments to form base particles 72. The base particles 72 are coated with a cured second coating composition 84 including a coating binder 86 and at least one infrared-reflective functional pigment 88 selected from the group consisting of light-interference platelet pigments including mica, light-interference platelet pigments including titanium dioxide, mirrorized silica pigments based upon metal-doped silica, and alumina. Optionally, the first coating composition 76 further comprises at least one infrared-reflective functional pigment 82 as well.

In this fourth embodiment, the at least one infrared-reflective functional pigment 82 preferably comprises from about 1 percent by weight to about 60 percent by weight of the first coating composition 76, as well as from about 1 percent by weight to about 60 percent by weight when the optional infrared-reflective functional pigment is employed in the second coating composition 84. When alumina is included in the cured first coating composition 76 or the second coating composition 84 as an infrared-reflective functional pigment, the particle size of the alumina is preferably less than 425 µm. More preferably, the particle size of the alumina is from about 0.1 µm to about 5 µm, and even more preferably from about 0.3 µm to about 2 µm. In this fourth embodiment, the second coating composition 84 comprises from about 2 percent by weight of the base particles 72 to about 20 percent by weight of the base particles 72, more preferably, from about 4 percent by weight of the base particles 72 to about 10 percent by weight of the base particles 72. In this fourth embodiment, the first or base coating composition 76 preferably comprises from about 1 percent by weight of the inert mineral particles 74 to about 20 percent by weight of the inert mineral particles 74. In this fourth embodiment, the base particle binder 78 preferably comprises an aluminosilicate material and an alkali metal silicate, and the aluminosilicate material is preferably clay, although an organic material can optionally be employed as the base particle binder 78.

Thus, in this fourth embodiment of colored infrared-reflective roofing granules 70 according to the present invention, the infrared reflectance of the colored roofing granules 70 is attributable to the infrared-reflective functional pigment 88 in the outer layer formed by the cured second coating composition 84, and the optional infrared-reflective functional pigment 82 in the inner layer formed by the cured first coating composition 76, while the color of the granules 70 is substantially attributable to the colorant 80 in the inner layer formed by the cured first coating composition 76.

Preferably, the cured second coating composition 84 is at least partially transparent to infrared radiation. Preferably, the thickness of the layer formed by the cured second coating composition 84, the coating binder 86, and at least one infrared-reflective functional pigment 82 are selected to maximize infrared transparency consistent with achieving the desired color tone for the roofing granule 70.

The present invention also provides a process for increasing the infrared or solar heat reflectance of conventional colored roofing granules. Conventional colored roofing granules are coated with a coating composition including a coating binder and at least one infrared-reflective functional pigment selected from the group consisting of light-interference platelet pigments including mica, light-interference platelet pigments including titanium dioxide, mirrorized silica pigments based upon metal-doped silica, and alumina. In this case the infrared reflectance of the conventional colored roofing granules is increased by at least about 20 percent, more preferably at least about 25 percent, while substantially maintaining the color of the roofing granules, such that the value of the total color difference $\Delta E^*$ is no more than 10 units, more preferably no more than 5 units, and even more preferably no more than 3 units.

The process of the present invention for producing infrared-reflective roofing granules comprises several steps. In one step of the present process, suitable base particles are provided. These can be suitably sized, chemically inert, mineral particles. Preferably, however, the base particles have already been coated with an initial coating composition containing a pigment, preferably a highly reflective pigment such as rutile titanium dioxide. The base particles are then coated using a second coating composition including a binder, and at least one solar-reflective pigment. The coating composition is then cured. Preferably, the at least one infrared-reflective functional pigment is selected from the group consisting of light-interference platelet pigments including mica, light-interference platelet pigments including titanium dioxide, mirrorized silica pigments based upon metal-doped silica, and alumina.

When alumina is employed as the at least one infrared-reflective pigment, the alumina (aluminum oxide) preferably has a particle size less than #40 mesh (425 µm), preferably between 0.1 µm and 5 µm, and more preferably between 0.3 µm and 2 µm. It is preferred that the alumina includes greater that 90 percent by weight $Al_2O_3$, and more preferably, greater than 95% by weight $Al_2O_3$.

Preferably, the at least one infrared-reflective functional pigment comprises from about 1 percent by weight to about 60 percent by weight of the coating composition. It is preferred that the coating composition comprises from about 2 percent by weight of the base particles to about 20 percent by weight of the base particles. More preferably, the coating composition comprises from about 4 percent by weight of the base particles to about 10 percent by weight of the base particles. The coating composition is cured to provide a layer of solar-reflective coating on the base particles.

Preferably, the infrared-reflective coating is provided in a thickness effective to render the coating opaque to infrared radiation, such as a coating thickness of at least about 100 µm. However, advantageous properties of the present invention can be realized with significantly lower coating thicknesses, such as at a coating thickness of from about 2 µm to about 25 µm, including at a coating thickness of about 5 µm.

In one presently preferred embodiment, the base particles are preferably provided by a process comprising providing an inert mineral particle; coating the inert mineral particle with a base coating composition including a binder and at least one colored pigment, and then curing the base coating composition.

In another presently preferred embodiment, the base particles are provided by a process comprising providing inert mineral particles; coating the inert mineral particles with a base coating composition including a binder and at least one infrared-reflective pigment, and then curing the base coating composition. In this case, the infrared-reflective pigment can also be a colored pigment.

Examples of white pigments that can be employed in the process of the present invention include rutile titanium dioxide, anatase titanium dioxide, lithopone, zinc sulfide, zinc oxide, lead oxide, and void pigments such as spherical styrene/acrylic beads (Ropaque® beads, Rohm and Haas Company), and hollow glass beads having pigmentary size for increased light scattering.

In one set of presently preferred embodiments, the colored pigment employed in the present invention comprises a colored, infrared-reflective pigment. Preferably, the colored, infrared-reflective pigment comprises a solid solution including iron oxide, such as disclosed in U.S. Pat. No. 6,174,360, incorporated herein by reference. The colored infrared-reflective pigment can also comprise a near infrared-reflecting composite pigment such as disclosed in U.S. Pat. No. 6,521,038, incorporated herein by reference. Composite pigments are composed of a near-infrared non-absorbing colorant of a chromatic or black color and a white pigment coated with the near infrared-absorbing colorant. Near-infrared non-absorbing colorants that can be used in the present invention are organic pigments such as organic pigments including azo, anthraquinone, phthalocyanine, perinone/perylene, indigo/thioindigo, dioxazine, quinacridone, isoindolinone, isoindoline, diketopyrrolopyrrole, azomethine, and azomethine-azo functional groups. Preferred black organic pigments include organic pigments having azo, azomethine, and perylene functional groups.

Preferably, the at least one colored pigment comprises from about 0.5 percent by weight to about 40 percent by weight of the base coating composition. It is also preferred that base coating composition comprises from about 2 percent by weight of the inert mineral particles to about 20 percent by weight of the inert mineral particles. Preferably, the base coating composition forms a layer having sufficient thickness to provide good hiding and opacity, such as a thickness of from about 5 µm to about 50 µm.

The base particle binder and the coating binder employed in the coating compositions of the present invention preferably comprise an aluminosilicate material, such as kaolin clay and an alkali metal silicate, such as sodium silicate. Alternatively, the base particle binder, and especially the coating binder, can comprise an organic material, such as a curable polymeric material.

Optionally, the coating compositions of the present invention further comprise at least one coloring material selected from the group consisting of coloring pigments and uv-stabilized dyes. Presently preferred coloring pigments include transition metal oxides.

The coating binder employed in the process of the present invention to form the coating composition including the infrared-reflective pigment is preferably formed from a mixture of an alkali metal silicate, such as aqueous sodium silicate, and heat reactive aluminosilicate material, such as clay, preferably, kaolin. The proportion of alkali metal silicate to heat-reactive aluminosilicate material is preferably from about 3:1 to about 1:3 parts by weight alkali metal silicate to parts by weight heat-reactive aluminosilicate material, more preferably about 2:1 to about 0.8:1 parts by weight alkali metal silicate to parts by weight heat-reactive aluminosilicate material. Alternatively, the base granules can be first mixed with the heat reactive aluminosilicate to coat the base granules, and the alkali metal silicate can be subsequently added with mixing.

The base particle binder employed in the base coating composition can similarly be formed from a mixture of an alkali metal silicate, such as aqueous sodium silicate, and heat reactive aluminosilicate material, such as clay, preferably, kaolin. The base coating binder can be the same as that employed for the solar-reflective coating.

When the infrared-reflective granules are fired at an elevated temperature, such as at least about 200 degrees C., and preferably about 250 to 500 degrees C., the clay reacts with and neutralizes the alkali metal silicate, thereby insolubilizing the binder. The binder resulting from this clay-silicate process, believed to be a sodium aluminum silicate, is porous, such as disclosed in U.S. Pat. No. 2,379,358 (incorporated herein by reference). Alternatively, the porosity of the insolubilized binder can be decreased by including an oxygen containing boron compound such as borax in the binder mixture, and firing the granules at a lower temperature, for example, about 250 degree C. to 400 degrees C., such as disclosed in U.S. Pat. No. 3,255,031 (incorporated herein by reference).

Examples of clays that can be employed in the process of the present invention include kaolin, other aluminosilicate clays, Dover clay, bentonite clay, etc.

The inorganic binder employed in the present invention can include an alkali metal silicate such as an aqueous sodium silicate solution, for example, an aqueous sodium silicate solution having a total solids content of from about 38 percent by weight to about 42 percent by weight, and having a ratio of $Na_2O$ to $SiO_2$ of from about 1:2 to about 1:3.25.

Organic binders can also be employed in the process of the present invention. The use of suitable organic binders, when cured, can also provide superior granule surface with enhanced granule adhesion to the asphalt substrate and with better staining resistance to asphaltic materials. Roofing granules colored by inorganic binders often require additional surface treatments to impart certain water repellency for granule adhesion and staining resistance. U.S. Pat. No. 5,240,760 discloses examples of polysiloxane-treated roofing granules that provide enhanced water repellency and staining resistance. With the organic binders, the additional surface treatments may be eliminated. Also, certain organic binders, particularly those water-based systems, can be cured by drying at much lower temperatures as compared to the inorganic binders such as metal-silicates, which often require curing at temperatures greater than about 500 degrees C. or by using a separate pickling process to render the coating durable.

Examples of organic binders that can be employed in the process of the present invention include acrylic polymers, alkyd and polyesters, amino resins, epoxy resins, phenolics, polyamides, polyurethanes, silicone resins, vinyl resins, polyols, cycloaliphatic epoxides, polysulfides, phenoxy, fluoropolymer resins. Examples of uv-curable organic binders that can be employed in the process of the present invention include uv-curable acrylates and uv-curable cycloaliphatic epoxides.

An organic material can be employed as a binder for the coating composition used in the process of the present invention. Preferably, a hard, transparent organic material is employed. Especially preferred are uv-resistant polymeric materials, such as poly(meth)acrylate materials, including poly methyl methacrylate, copolymers of methyl methacrylate and alkyl acrylates such as ethyl acrylate and butyl acrylate, and copolymers of acrylate and methacrylate monomers with other monomers, such as styrene. Preferably, the monomer composition of the copolymer is selected to provide a hard, durable coating. If desired, the monomer mixture can include functional monomers to provide desirable properties, such as crosslinkability to the copolymers. The organic material can be dispersed or dissolved in a suitable solvent, such as coatings solvents well known in the coatings arts, and the resulting solution used to coat the granules using conventional coatings techniques. Alternatively, water-borne emulsified organic materials, such as acrylate emulsion polymers, can be employed to coat the granules, and the water subsequently removed to allow the emulsified organic materials of the coating composition to coalesce.

Examples of near IR-reflective pigments available from the Shepherd Color Company, Cincinnati, Ohio, include Arctic Black 10C909 (chromium green-black), Black 411 (chromium iron oxide), Brown 12 (zinc iron chromite), Brown 8 (iron titanium brown spinel), and Yellow 193 (chrome antimony titanium).

Light-interference platelet pigments are known to give rise to various optical effects when incorporated in coatings, including opalescence or "pearlescence." Surprisingly, light-interference platelet pigments have been found to provide or enhance infrared-reflectance of roofing granules coated with compositions including such pigments.

Examples of light-interference platelet pigments that can be employed in the process of the present invention include pigments available from Wenzhou Pearlescent Pigments Co., Ltd., No. 9 Small East District, Wenzhou Economical and Technical Development Zone, Peoples Republic of China, such as Taizhu TZ5013 (mica, rutile titanium dioxide and iron oxide, golden color), TZ5012 (mica, rutile titanium dioxide and iron oxide, golden color), TZ4013 (mica and iron oxide, wine red color), TZ4012 (mica and iron oxide, red brown color), TZ4011 (mica and iron oxide, bronze color), TZ2015 (mica and rutile titanium dioxide, interference green color), TZ2014 (mica and rutile titanium dioxide, interference blue color), TZ2013 (mica and rutile titanium dioxide, interference violet color), TZ2012 (mica and rutile titanium dioxide, interference red color), TZ2011 (mica and rutile titanium dioxide, interference golden color), TZ1222 (mica and rutile titanium dioxide, silver white color), TZ1004 (mica and anatase titanium dioxide, silver white color), TZ4001/600 (mica and iron oxide, bronze appearance), TZ5003/600 (mica, titanium oxide and iron oxide, gold appearance), TZ1001/80 (mica and titanium dioxide, off-white appearance), TZ2001/600 (mica, titanium dioxide, tin oxide, off-white/gold appearance), TZ2004/600 (mica, titanium dioxide, tin oxide, off-white/blue appearance), TZ2005/600 (mica, titanium dioxide, tin oxide, off-white/green appearance), and TZ4002/600 (mica and iron oxide, bronze appearance).

Examples of light-interference platelet pigments that can be employed in the process of the present invention also include pigments available from Merck KGaA, Darmstadt, Germany, such as Iriodin® pearlescent pigment based on mica covered with a thin layer of titanium dioxide and/or iron oxide; Xirallic™ high chroma crystal effect pigment based upon $Al_2O_3$ platelets coated with metal oxides, including Xirallic T 60-10 WNT crystal silver, Xirallic T 60-20 WNT sunbeam gold, and Xirallic F 60-50 WNT fireside copper; ColorStream™ multi color effect pigments based on $SiO_2$ platelets coated with metal oxides, including ColorStream F 20-00 WNT autumn mystery and ColorStream F 20-07 WNT viola fantasy; and ultra interference pigments based on $TiO_2$ and mica.

Examples of mirrorized silica pigments that can be employed in the process of the present invention include pigments such as Chrom Brite™ CB4500, available from Bead Brite, 400 Oser Ave, Suite 600, Hauppauge, N.Y. 11788.

Aluminum oxide, preferably in powdered form, can be used as solar-reflective additive in the color coating formulation to improve the solar reflectance of colored roofing granules without affecting the color. The aluminum oxide should have a particle size less than #40 mesh (425 µm), preferably between 0.1 µm and 5 µm. More preferably, the particle size is between 0.3 µm and 2 µm. The alumina should have percentage $Al_2O_3$>90%, more preferably >95%.

The infrared-reflective roofing granules of the present invention can include conventional coatings pigments. Examples of coatings pigments that can be used include those provided by the Color Division of Ferro Corporation, 4150 East 56th St., Cleveland, Ohio 44101, and produced using high temperature calcinations, including PC-9415 Yellow, PC-9416 Yellow, PC-9158 Autumn Gold, PC-9189 Bright Golden Yellow, V-9186 Iron-Free Chestnut Brown, V-780 Black, V0797 IR Black, V-9248 Blue, PC-9250 Bright Blue, PC-5686 Turquoise, V-13810 Red, V-12600 Camouflage Green, V12560 IR Green, V-778 IR Black, and V-799 Black. Further examples of coatings pigments that can be used include white titanium dioxide pigments provided by Du Pont de Nemours, P.O. Box 8070, Wilmington, Del. 19880.

Pigments with high near IR transparency are preferred for use in coatings applied over white, reflective base coats. Such pigments include pearlescent pigments, light-interference platelet pigments, ultramarine blue, ultramarine purple, cobalt chromite blue, cobalt aluminum blue, chrome titanate, nickel titanate, cadmium sulfide yellow, cadmium sulfoselenide orange, and organic pigments such as phthalo blue, phthalo green, quinacridone red, diarylide yellow, and dioxazine purple. Conversely, color pigments with significant infrared absorbency and/or low infrared transparency are preferably avoided when preparing coatings for use over white, reflective base coats. Examples of pigments providing high infrared absorbency and/or low infrared transparency include carbon black, iron oxide black, copper chromite black, iron oxide brown natural, and Prussian blue.

The solar heat reflectance properties of the solar heat-reflective roofing granules of the present invention are determined by a number of factors, including the type and concentration of the solar heat-reflective pigment(s) used in the solar heat-reflective coating composition, whether a base coating is employed, and if so, the type and concentration of the reflective white pigment employed in the base coating, the nature of the binder(s) used in for the solar heat-reflective coating and the base coating, the number of coats of solar heat-reflective coating employed, the thickness of the solar heat-reflective coating layer and the base coating layer, and the size and shape of the base particles.

Infrared-reflective coating compositions according to the present invention can also include supplementary pigments to space infrared-reflecting pigments, to reduce absorption by multiple-reflection. Examples of such "spacing" pigments include amorphous silicic acid having a high surface area and produced by flame hydrolysis or precipitation, such as Aerosil TT600 supplied by Degussa, as disclosed in U.S. Pat. No. 5,962,143, incorporated herein by reference.

The present invention provides mineral-surfaced asphalt shingles with L* less than 85, and more preferably less than 55, and solar reflectance greater than 25%. Preferably, asphalt shingles according to the present invention comprise colored, infrared-reflective granules according to the present invention, and optionally, conventional colored roofing granules. Conventional colored roofing granules and infrared-reflective roofing granules can be blended in combinations to generate desirable colors. The blend of granules is then directly applied onto hot asphalt coating to form the shingle. Examples of granule deposition apparatus that can be employed to manufacture asphalt shingles according to the present invention are provided, for example, in U.S. Pat. Nos. 4,583,486, 5,795,389, and 6,610,147, and U.S. Patent Application Publication U.S. 2002/0092596.

The process of the present invention advantageously permits the solar reflectance of the shingles employing the solar-reflective granules to be tailored to achieve specific color effects.

The colored, infrared-reflective granules prepared according to the process of the present invention can be employed in the manufacture of infrared-reflective roofing products, such as infrared-reflective asphalt shingles, using conventional roofing production processes. Typically, bituminous roofing products are sheet goods that include a non-woven base or a scrim formed of a fibrous material, such as a glass fiber scrim. The base is coated with one or more layers of a bituminous material such as asphalt to provide water and weather resistance to the roofing product. One side of the roofing product is typically coated with mineral granules to provide durability, reflect heat and solar radiation, and to protect the bituminous binder from environmental degradation. The colored, infrared-reflective granules of the present invention can be mixed with conventional roofing granules, and the granule mixture can be embedded in the surface of such bituminous roofing products using conventional methods. Alternatively, the colored, infrared-reflective granules of the present invention can be substituted for conventional roofing granules in manufacture of bituminous roofing products to provide those roofing products with solar reflectance.

Bituminous roofing products are typically manufactured in continuous processes in which a continuous substrate sheet of a fibrous material such as a continuous felt sheet or glass fiber mat is immersed in a bath of hot, fluid bituminous coating material so that the bituminous material saturates the substrate sheet and coats at least one side of the substrate. The reverse side of the substrate sheet can be coated with an anti-stick material such as a suitable mineral powder or a fine sand. Roofing granules are then distributed over selected portions of the top of the sheet, and the bituminous material serves as an adhesive to bind the roofing granules to the sheet when the bituminous material has cooled. The sheet can then be cut into conventional shingle sizes and shapes (such as one foot by three feet rectangles), slots can be cut in the shingles to provide a plurality of "tabs" for ease of installation, additional bituminous adhesive can be applied in strategic locations and covered with release paper to provide for securing successive courses of shingles during roof installation, and the finished shingles can be packaged. More complex methods of shingle construction can also be employed, such as building up multiple layers of sheet in selected portions of the shingle to provide an enhanced visual appearance, or to simulate other types of roofing products. Alternatively, the sheet can be formed into membranes or roll goods for commercial or industrial roofing applications.

The bituminous material used in manufacturing roofing products according to the present invention is derived from a petroleum-processing by-product such as pitch, "straight-run" bitumen, or "blown" bitumen. The bituminous material can be modified with extender materials such as oils, petroleum extracts, and/or petroleum residues. The bituminous material can include various modifying ingredients such as polymeric materials, such as SBS (styrene-butadiene-styrene) block copolymers, resins, flame-retardant materials, oils, stabilizing materials, anti-static compounds, and the like. Preferably, the total amount by weight of such modifying ingredients is not more than about 15 percent of the total weight of the bituminous material. The bituminous material can also include amorphous polyolefins, up to about 25 percent by weight. Examples of suitable amorphous polyolefins include atactic polypropylene, ethylene-propylene rubber, etc. Preferably, the amorphous polyolefins employed have a softening point of from about 130 degrees C. to about 160 degrees C. The bituminous composition can also include a suitable filler, such as calcium carbonate, talc, carbon black, stone dust, or fly ash, preferably in an amount from about 10 percent to 70 percent by weight of the bituminous composite material.

The following examples are provided to better disclose and teach processes and compositions of the present invention. They are for illustrative purposes only, and it must be acknowledged that minor variations and changes can be made without materially affecting the spirit and scope of the invention as recited in the claims that follow.

In the examples, granule color measurements were made using the Roofing Granules Color Measurement Procedure from the Asphalt Roofing Manufacturers Association (ARMA) Granule Test Procedures Manual, ARMA Form No. 441-REG-96.

Example 1

Roofing granules are prepared by using 1 kg of US #11 grade mineral particles as a base followed by color coating with a mixture of 35 g sodium silicate binder from Occidental Petroleum Corp., 17.5 g of kaolin clay from Unimin Corp., and 16 g of TZ1001 pearlescent pigment from Global Pigments, LLC. The color-coated granules are heat-treated in a rotary drum at temperatures between 480 degrees C.-510 degrees C. in order to cure the coating. The finished granules have a brownish gray appearance with an average solar heat reflectance of 23.5% measured by a D&S Solar Reflectometer, as compared to initial solar reflectance of 18.2%.

Example 2

In this example, a highly reflective, white-pigmented inner coating is used as a substrate to reflect additional infrared radiation, while an outer color coating with IR-reflective pigments are used to provide desirable colors. 1 kg of white $TiO_2$ pigmented roofing granules with solar heat reflectance greater than 30% (CertainTeed Corp., Gads Hill, Mo.) are used as the base mineral particles and are colored by a second coating comprised of 100 g organic binder (Rohm and Haas Rhoplex® EI-2000), 12 g of TZ4002 and 3 g of TZ1003 pearlescent pigments both from Global Pigments, LLC. The resultant granules are dried in a fluidized bed dryer to a free-flowing granular mass with very desirable deep, reddish gold appearance (L*=44.10, a*=20.79, b*=18.59). The cured granule sample has a high solar reflectance of 31.0% as compared to the 22% reflectance of roofing granules with similar colors obtained by typical inorganic pigments, e.g., Bayer 3488x tan (CI #77496) pigment and the Bayer 120N red (CI #77491) pigment.

Examples 3a, 3b and 3c

Figure 5:
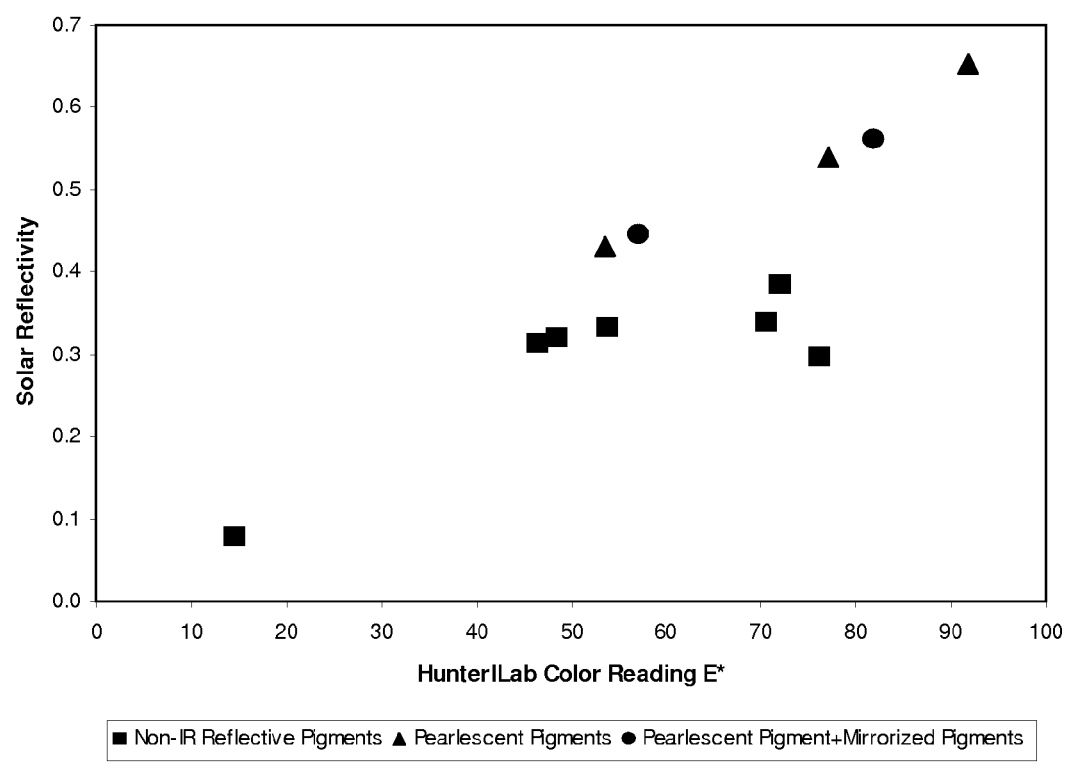
FIG. 5 is a graph of solar heat reflectance versus E* (the square root of the sum of the squares of L*, a*, and b*) for a series of conventional inorganic pigments, a series of light-interference platelet pigment and a mixture of 65% weight/weight light-interference platelet pigment, 35% mirrorized pigment.

The effects of light-interference platelet pigments on solar heat reflectance is evaluated by a drawdown method. Samples of drawdown material are prepared by mixing 20 g of sodium silicate from Occidental Petroleum Corp. and 2 g of each of TZ5013, TZ5012, TZ4013 pearlescent pigments from Global Pigments, LLC, respectively, using a mechanical stirrer under low shear conditions. Each coating is cast from a respective sample of drawdown material using a 10 mil stainless steel drawdown bar (BYK-Gardner, Columbia, Md.) on a WB chart from Leneta Company. The resulting uniform coating is air-dried to touch and the solar heat reflectance is measured using a D&S Solar Reflectometer. The color is also measured using a HunterLab Colorimeter. By plotting the solar heat reflectance vs. the strength in color space using E* (E*=$(L^{*2}+a^{*2}+b^{*2})^{1/2}$, it is shown that the light-interference platelet pigments exhibit significantly higher solar heat reflectance over the traditional inorganic color pigments, e.g., iron-oxide red pigments (120N from Bayer Corp.; R-4098 from Elementis Corp.), ultramarine blue pigment (5007 from Whittaker), mixed metal-oxide yellow pigments (3488x from Bayer Corp.; 15A from Rockwood Pigments), chrome-oxide green pigments (GN from Bayer Corp.), or iron-oxide umber pigments (JC444 from Davis Colors), while creating deep, desirable tan, gold, or purplish red colors. The results of the measurements are provided below in Table 2 and displayed in FIG. 5.

Examples 4a and 4b

The effect of employing a mirrorized pigment on solar heat reflectance is demonstrated by using the drawdown method of Example 3. The test is repeated except that mirrorized pigments from Bead Brite Glass Products, Inc., are substituted for 20% by weight of the pearlescent pigments of Examples 3b and 3c. The results, which show further enhancement of solar heat reflectance, are provided in Table 2 and displayed in FIG. 5.

TABLE 2

|  | Pigment Type | Color Reading, E* | Solar heat reflectance |
|---|---|---|---|
| Comparative Example 1 | Bayer 120N Red | 53.88 | 0.332 |
| Comparative Example 2 | Whittaker 5007 Ultramarine Blue | 76.17 | 0.298 |
| Comparative Example 3 | Elementis R4098 Red Iron Oxide | 48.47 | 0.320 |
| Comparative Example 4 | Davis Colors JC 444 Umber | 14.44 | 0.077 |
| Comparative Example 5 | Rockwood 15A Tan | 71.93 | 0.385 |
| Comparative Example 6 | Bayer GN Chrome Oxide Green | 46.46 | 0.313 |
| Comparative Example 7 | Bayer 3488x Tan | 70.54 | 0.339 |
| Example 3a | Global Pigments TZ 5013 Tan | 91.82 | 0.653 |
| Example 3b | Global Pigments TZ 5012 Gold | 77.06 | 0.539 |
| Example 3c | Global Pigments TZ4013 Red | 53.66 | 0.431 |
| Example 4a | 65% TZ 5012 + 20% Mirrorized Pigment | 81.74 | 0.560 |
| Example 4b | 65% TZ 4013 + 20% Mirrorized Pigment | 57.15 | 0.446 |

Example 5

Roofing granules are prepared by using 1 kg of US #11 grade mineral particles as a base followed by color coating with a mixture of 40.6 g sodium silicate binder from Occidental Petroleum Corp., 25.0 g of kaolin clay from Wilky Clay Co., 2.6 g of 799 black pigment from Ferro Corp., and 2.5 g of 9508SW pearlescent pigment from EM Industries Inc. The color-coated granules are heat-treated in a rotary drum at elevated temperature between 480 degrees C.-510 degrees C. in order to cure the coating. The finished granules have a color reading of $L^*=32.77$, $a^*=5.05$, $b^*=5.66$ as measured by the HunterLab colorimeter, and match closely to a commercially available roofing granules of #41 brown from CertainTeed Corp., Norwood, Mass. The prepared granules with IR-pigments have a solar heat reflectance of 22%, which is significantly higher than the 14% solar heat reflectance obtained from the #41 brown roofing granules made from non-IR pigments, e.g., the Bayer 3488x tan (CI #77496) pigment, the Bayer 120N red (CI #77491) pigment, the 807 carbon black (CI #77266) from Rockwood Pigments, and the JC444 umber pigment (CI #77499) also from Rockwood Pigments Co.

Example 6

The effect of transparent, IR-reflective pigments based on metal oxide-mica is demonstrated by using the drawdown method of Example 3. 20 g of sodium silicate binder (Occidental Petroleum Corp.) and 0.1 g of the said pigment (Solar Flair 870, EM Industries, Inc., Hawthorne, N.Y.) are mixed at 300 rpm using a mechanical stirrer under low shear conditions and are drawn to form a thin, clear coating with 10 mil drawdown application (BYK-Gardner, Columbia, Md.) on a black lacquered paper (Leneta 5C, also from BYK-Gardner, Columbia, Md.). After air-drying, the solar reflectance of the clear coating is measured using a D&S Solar Reflectometer against the black background. The coating is found to increase the solar heat reflectance from 7.8% of the black background to 10.7%, without any visible change to the background color.

Example 7

A coating formulation for roofing granules comprised of 32.5 g sodium silicate (Oxychem grade 42), 20.1 g of kaolin slurry (Royale slurry from Unimin Corp.), and 3.6 g of water was prepared in a container by mixing the ingredients using a mechanical stirrer at 300 rpm under low shear conditions. The coating composition had an off-white color and was evaluated by drawdown method using a 10 mil drawdown bar (#SAR-5306 from BYK Gardner Instruments) on a drawdown paper (Form 105C from Leneta Co.). The coating had a color reading of $L^*=86.53$, $a^*=0.41$, and $b^*=16.24$, as measured using a HunterLab calorimeter, and a solar reflectance of 15% as measured by a portable solar reflectometer (Device & Service Instrument) against a black background. 2.0 g of alumina powder with a particle size of 0.3 mm (Op-Alumina powder from Struers) was added to the same coating formulation. The resulting coating composition was evaluated by using the same drawdown method. The addition of alumina powder was found to significantly increase the coating solar reflectance to 24%, while keeping the color reading about the same at $L^*=86.25$, $a^*=0.56$, and $b^*=16.04$.

Various modifications can be made in the details of the various embodiments of the processes, compositions and articles of the present invention, all within the scope and spirit of the invention and defined by the appended claims.

The invention claimed is:

1. A roofing product comprising colored infrared reflective roofing granules selected from the group consisting of
   (a) granules comprising base particles comprising inert mineral particles coated with a cured first coating composition comprising including a base particle binder and at least one colorant selected from the group consisting of uv-stabilized dyes and granule coloring pigments, the base particles being coated with a cured second coating composition comprising a coating binder and at least one infrared-reflective functional pigment;
   (b) granules comprising base particles comprising inert mineral particles coated with a cured first coating composition including a base particle binder and at least one reflective white pigment, the base particles being coated with a cured second coating composition including a coating binder, and at least one colorant selected from the group consisting of pigments with near infrared transparency;
   (c) granules comprising inert base particles with size passing #8 mesh and retaining on #70 mesh coated with a cured coating composition comprising a coating binder and at least one colored, infrared-reflective pigment;
   (d) granules comprising base particles with size passing #8 mesh and retaining on #70 mesh coated with a cured coating composition comprising a coating binder and at least one colored, infrared-reflective pigment wherein the base particles comprise mineral particles coated with a cured base coating composition including a base particle binder, and at least one reflective white pigment;
   (e) granules comprising base particles comprising inert mineral particles coated with a cured first coating composition including a base particle binder and at least one reflective white pigment, the base particles being coated with a cured second coating composition including a coating binder, and at least one colorant selected from the group consisting of uv-stabilized dyes and granule coloring pigments;

(f) granules comprising inert mineral particles coated with a cured first coating composition including a base particle binder and at least one colorant selected from the group consisting of uv-stabilized dyes and granule coloring pigments to form base particles, the base particles being coated with a cured second coating composition including a coating binder and at least one infrared-reflective functional pigment selected from the group consisting of light-interference platelet pigments including mica, light-interference platelet pigments including titanium dioxide, mirrorized silica pigments based upon metal-doped silica, and alumina; and (g) combinations thereof.

2. A roofing product according to claim 1, wherein the roofing product comprises a shingle.

3. A roofing product according to claim 1, wherein the roofing product comprises a roll good.

4. A roofing product according to claim 1, wherein the roofing product comprises a membrane.

5. A roofing product according to claim 1, wherein the roofing product comprises a bituminous roofing product.

6. A roofing product according to claim 1, wherein the roofing product comprises a bituminous coating material.

7. A roofing product according to claim 1, wherein the roofing granules are adhered to a shingle stock material.

8. A roofing product according to claim 1, wherein the roofing product has an L* of less than 55.

9. A roofing product according to claim 1, wherein the roofing product has a solar reflectance great than 25%.

10. A process for preparing a roofing product, the process comprising:

(a) providing colored infrared reflective roofing granules selected from the group consisting of:

(1) granules comprising case particles comprising inert mineral particles coated with a cured first coating composition comprising including a base particle binder and at least one colorant selected from the group consisting of uv-stabilized dyes and granule coloring pigments, the base particles being coated with a cured second coating composition comprising a coating binder and at least one infrared-reflective functional pigment;

(2) granules comprising base particles comprising inert mineral particles coated with a cured first coating composition including a base particle binder and at least one reflective white pigment, the base particles being coated with a cured second coating composition including a coating binder, and at least one colorant selected from the group consisting of pigments with near infrared transparency;

(3) granules comprising inert base particles with size passing #8 mesh and retaining on #70 mesh coated with a cured coating composition, a coating binder and at least one colored, infrared-reflective pigment;

(4) granules comprising base particles with size passing #8 mesh and retaining on #70 mesh coated with a cured coating composition comprising a coating binder and at least one colored, infrared-reflective pigment wherein the base parti9cles comprise mineral particles coated with a cured base coating composition including a base particle binder, and at least one reflective white pigment;

(5) granules comprising base particles comprising inert mineral particles coated with a cured first coating composition including a base particle binder and at least one reflective white pigment, the base particles being coated with a cured second coating composition including a coating binder, and at least one colorant selected from the group consisting of uv-stabilized dyes and granule coloring pigments;

(6) granules comprising inert mineral particles coated with a cured firs coating composition including a base particle binder and at least one colorant selected from the group consisting of uv-stabilized dyes and granule coloring pigments to form base particles, the base particles being coated with a cured second coating composition including a coating binder and at least one infrared-reflective functional pigment selected from the group consisting of light-interference platelet pigments including mica, light-interference platelet pigments including titanium dioxide, mirrorized silica pigments based upon metal-doped silica, and alumina; and (7) combinations thereof; and (b) adhering the granules to a shingle stock material.

11. A process according to claim 10, wherein the step of providing colored infrared roofing granules comprises:

(a) coating colored roofing granules with a coating composition including a coating binder and at least one infrared-reflective functional pigment selected from the group consisting of light-interference platelet pigments including mica, light-interference platelet pigments including titanium dioxide, mirrorized silica pigments based upon metal-doped silica, and alumina; and (b) curing the coating binder to provide the colored infrared reflective roofing granules.

12. A process according to claim 1, wherein the roofing product comprises a shingle.

13. A process according to claim 10, wherein the roofing product comprises a roll good.

14. A process according to claim 10, wherein the roofing product comprises a membrane.

15. A process according to claim 10, wherein the shingle stock material comprises a bituminous roofing product.

16. A process according to claim 10, wherein the shingle stock material comprises a bituminous coating material.

17. A process according to claim 10, wherein the roofing product has an L* of less than 55.

18. A process according to claim 11, wherein the roofing product has a solar reflectance great than 25%.

19. A process according to claim 10, wherein the roofing product has a solar reflectance greater than 25%.

20. A process according to claim 19, wherein the roofing product has an L* of less than 55.

* * * * *